US005914034A

United States Patent [19]
Ding et al.

[11] Patent Number: 5,914,034
[45] Date of Patent: Jun. 22, 1999

[54] CENTRIFUGAL FLOTATION CELL WITH ROTATING FEED

[75] Inventors: Jian Ding, Toronto; Wan-Tai Yen; Alan R. Pindred, both of Kingston, all of Canada

[73] Assignee: Inter-Citic Envirotec, Inc., Chicago, Ill.

[21] Appl. No.: 08/871,227

[22] Filed: Jun. 9, 1997

[51] Int. Cl.[6] .............................. B01D 21/26; B03D 1/14

[52] U.S. Cl. .................. 210/221.2; 210/319; 210/360.1; 210/380.1; 210/512.3; 209/169; 209/170; 261/76; 261/124; 494/20

[58] Field of Search ................................ 210/319, 360.1, 210/380.1, 221.1, 221.2, 512.3, 520, 703, 295, 781, 304, 787, 800, 299, 806; 494/26, 60; 209/164, 168, 169, 170; 261/76, 122.1, 124

[56] References Cited

U.S. PATENT DOCUMENTS

| | | | |
|---|---|---|---|
| Re. 26,844 | 3/1970 | Cuza | 210/178 |
| Re. 34,321 | 7/1993 | Campbell | 494/26 |
| 479,453 | 7/1892 | Peck . | |
| 617,864 | 1/1899 | Skinner . | |
| 1,585,393 | 5/1926 | Laughlin . | |
| 2,749,031 | 6/1956 | Hornbostel . | |
| 2,860,776 | 11/1958 | Hays . | |
| 2,872,104 | 2/1959 | Cizinsky . | |
| 2,928,592 | 3/1960 | Johnson . | |
| 3,080,108 | 3/1963 | Jacobson . | |
| 3,311,296 | 3/1967 | Torobin . | |
| 3,460,750 | 8/1969 | Silla . | |
| 3,640,452 | 2/1972 | Thylefors . | |
| 3,991,935 | 11/1976 | Henning . | |
| 4,085,889 | 4/1978 | Steimel . | |
| 4,152,254 | 5/1979 | Steier et al. | 209/148 |
| 4,186,096 | 1/1980 | Areaux et al. | 210/377 |
| 4,247,391 | 1/1981 | Lloyd | 209/164 |
| 4,253,960 | 3/1981 | Dudley et al. | 210/373 |
| 4,279,741 | 7/1981 | Campbell | 209/44 |
| 4,347,971 | 9/1982 | Novoselac . | |
| 4,353,499 | 10/1982 | Simonds . | |
| 4,874,357 | 10/1989 | Campbell | 494/26 |
| 5,249,688 | 10/1993 | Hwang | 210/221.2 |
| 5,582,742 | 12/1996 | Wilkie et al. | 210/360.1 |

*Primary Examiner*—David A. Reifsnyder
*Attorney, Agent, or Firm*—Welsh & Katz, Ltd.; Thomas W. Tolpin

[57] ABSTRACT

A superb centrifugal flotation cell with a rotating feed, is provided for use in an effective separation process to rapidly recover greater quantities of valuable fine particles. In the process, a slurry of fine particles is injected with air bubbles and moved downwardly through a stationary pipe and a rotating feed line comprising a centrifugal rotating downfeeder. The slurry is centrifugally discharged from the rotating downfeeder into the flotation chamber where the slurry is separated into a waste stream of non-floating gangue material and a particulate-enriched froth comprising air bubbles carrying a substantial amount of the valuable fine particles for further processing.

15 Claims, 2 Drawing Sheets

CENTRIFUGAL FLOTATION CELL WITH ROTATING FEED

BACKGROUND OF THE INVENTION

This invention pertains to separating fine particles from ore minerals, mine tailings and the like and, more particularly, to recovering valuable fine particles of minerals and metals by centrifuging and froth flotation.

Centrifuges and centrifugal separators are commonly used to separate fluid mixtures by centrifugal force into higher density and lower density fractions in order to separate one material from another material. Conventional centrifuges and centrifugal separators have met with varying degrees of success depending on the materials being separated. Many conventional centrifuges, however, are expensive, have high operational energy requirements, create excessive turbulence, cause high pressure discharges, and can require complex auxiliary equipment, such as slurry accelerators.

Another type of separating process is froth flotation. In conventional (traditional) froth flotation, an input stream, such as a mineral slurry, is combined and commingled with an airstream. Conventional froth flotation separates materials primarily by the attachment of air bubbles and mineral particles. Air bubbles attach with hydrophobic material from the input stream float to the surface as a froth, while hydrophillic material unable to attache with bubbles sinks to the bottom. The froth is skimmed off the surface.

Froth flotation is a known process for the separation of finely ground minerals from slurries or suspensions in a liquid, usually water. The particles desired to remove from the slurry can be treated with chemical reagents to render them hydrophobic or water repellent, and a gas, usually air, is introduced into the slurry in the form of small bubbles. The air bubbles contact with the hydrophobic particles and carry them to the surface of the slurry to form a stabilized froth. The froth containing the floated particles is then removed as the concentrate or float product, while any hydrophilic particles remain submerged in the slurry and then are discharged. Conventional froth flotation has met with varying degrees of success.

Precious metals and valuable minerals are mined from ores and mineral deposits throughout the world for a variety of uses. It is important to maximize recovery of precious metals and valuable minerals during mining operation from an economic standpoint and operate the mine in an environmentally responsible and safe manner. Mining operations produce huge ponds of tailings containing very fine particles (fines) of precious metals and valuable minerals which are generally not recoverable by conventional, traditional froth flotation, and other conventional separating techniques.

Many industries use precious metals and valuable minerals for different purposes. For example, oil refineries and petrochemicals plants use platinum, nickel, antimony, etc. for catalysts to convert oil into fractions which are useful to produce gasoline and other fuels, as well as to produce chemicals for textiles and plastics. Once the catalysts have been used, precious metals can often be recovered or regenerated for further use. Numerous methods have been used in an effort to reclaim precious metals. In reclamation, vast reservoirs of tailings containing fine particles (fines) of precious metals are often produced but the valuable fines are generally unable to be reclaimed by conventional, froth flotation and other conventional separating techniques.

A centrifugal flotation cell has been developed as described in Campbell U.S. Pat. No. 4,874,357, which combines centrifuging and froth flotation to recover a greater amount of valuable fines. While this provides a very useful apparatus and method, it is desirable to provide an improved centrifugal flotation cell and process which are faster, more economical and recover greater quantities of valuable fines, as well as which overcome most, if not all, of the preceding problems.

SUMMARY OF THE INVENTION

An improved, highly efficient, centrifugal flotation cell and process are provided to more readily recover a greater quantity valuable fine particles, such as particulates of gold, platinum, silver, nickel, sulphides and other metals, ores, trace elements, minerals and oil. Advantageously, the novel centrifugal flotation cell and process are efficient, economical and effective. Furthermore, the outstanding centrifugal flotation cell and process are able to recover very small valuable fine particles in tailings which most prior systems and processes are unable to reclaim.

Desirably, the user-friendly centrifugal flotation cell and process utilize a combination of centrifugal and gravitational forces and froth flotation to rapidly recover minute particulates. Significantly, the centrifugal flotation cell and process are easy to use, reliable, attractive, and provide a greater throughput and recovery rate than conventional separation equipment and methods.

To this end, the novel centrifugal flotation process comprises injecting gaseous bubbles, preferably air bubbles, into a slurry of fine particles, such as by air injectors, an aerator or preferably a sparger, in order to sparge and aerate the slurry. The slurry and air bubbles are directed in a downward direction while simultaneously rotating and centrifuging the slurry and air bubbles, preferably in a centrifugal downfeeder, such as an elongated rotatable conduit, pipe, or tube, to separate the slurry into a waste stream comprising non-floating gangue material, and a particulate-enriched froth comprising air bubbles carrying and containing a substantial portion of the valuable particulates sought to be recovered. The waste stream is discharged and removed. The particulate-enriched froth is removed and recovered by froth flotation. In the preferred process, the feeding stream is radially discharged from a series of exit ports in the bottom portion of the centrifugal downfeeder before the froth rises to the surface and travels radially outwardly over an overflow wier into a discharge chute and froth launder. Desirably, the bottom of the centrifugal downfeeder is partially blocked, plugged and closed to substantially prevent downward vertical discharge of the waste stream and froth from the exit ports and downfeeder along the vertical axis of the downfeeder. Preferably, the feeding stream is baffled and confined by upper and lower base plates (confinement plates) upon exiting from the exit ports to enhance radial discharge of the waste stream and froth from the bottom portion of the centrifugal downfeeder.

In the illustrative embodiment, the slurry and air bubbles are passed downwardly through a stationary pipe, tube or conduit before being rotated, centrifuged and directed downwardly in the centrifugal downfeeder. If desired, the slurry and air bubbles can flow concurrently in a horizontal direction before being directed downwardly into the stationary pipe, tube or conduit. The feeding slurry can also flow in an upward direction before being injected with air bubbles.

The novel centrifugal flotation cell with a rotating feed has a centrifugal rotating downfeeder to move and aerate a slurry feed of fine particles and gaseous bubbles in a downward direction. A motor is operatively associated with the centrifugal downfeeder, to rotate the downfeeder, such as via a belt and pulley wheels, or gears, shaft, etc., with sufficient speed and centrifugal force to separate the aerated slurry into a waste stream comprising non-floating gangue material and a particulate-enriched froth carrying a substantial portion of the particulates (fines). In the preferred form, a collar connects the centrifugal rotating downfeeder to an overhead stationary, fixed vertical pipe, conduit or tube. The collar has belt-receiving surface and preferably comprises a pulley wheel (pulley) which is driven and rotated by a drive belt. The drive belt can be rotated and driven by a drive wheel (pulley) which is operatively connected to the motor.

A flotation chamber can be positioned about the rotating downfeeder. The flotation chamber can have an outlet positioned at a level below the downfeeder to discharge the waste stream. The flotation chamber can also have an overflow portion, preferably comprising a wier with a discharge chute, to discharge the froth for further processing and recovery.

In order to prevent downward egress of the slurry and waste stream from the interior of the centrifugal rotating downfeeder, a barrier is provided to close the bottom of the downfeeder. The barrier can be in the form of a platform, disc, or base plate. Desirably, the barrier has a greater transverse span (diameter or width) than the downfeeder. The downfeeder can have apertures or holes which provide exit ports at the lower end of the downfeeder, above the barrier, for lateral and radial discharge of the feeding stream. An upper barrier can be positioned above the exit ports to contain and block upward flow of the feeding stream to further enhance lateral and radial discharge of the feeding stream.

In the illustrative embodiment, a slurry feed line communicates with the downfeeder to pass slurry to the downfeeder and a sparger is positioned in the slurry line to inject air bubbles in the slurry. The slurry can flow in an upward direction, before being injected with air bubbles. The slurry and air bubbles can also flow concurrently in a horizontal direction before being directed downwardly into the centrifugal downfeeder.

A more detailed explanation of the invention is provided in the following description and appended claims taken in conjunction with the accompanying drawings.

DETAILED DESCRIPTION OF THE PREFERRED EMBODIMENT

Figure 1:
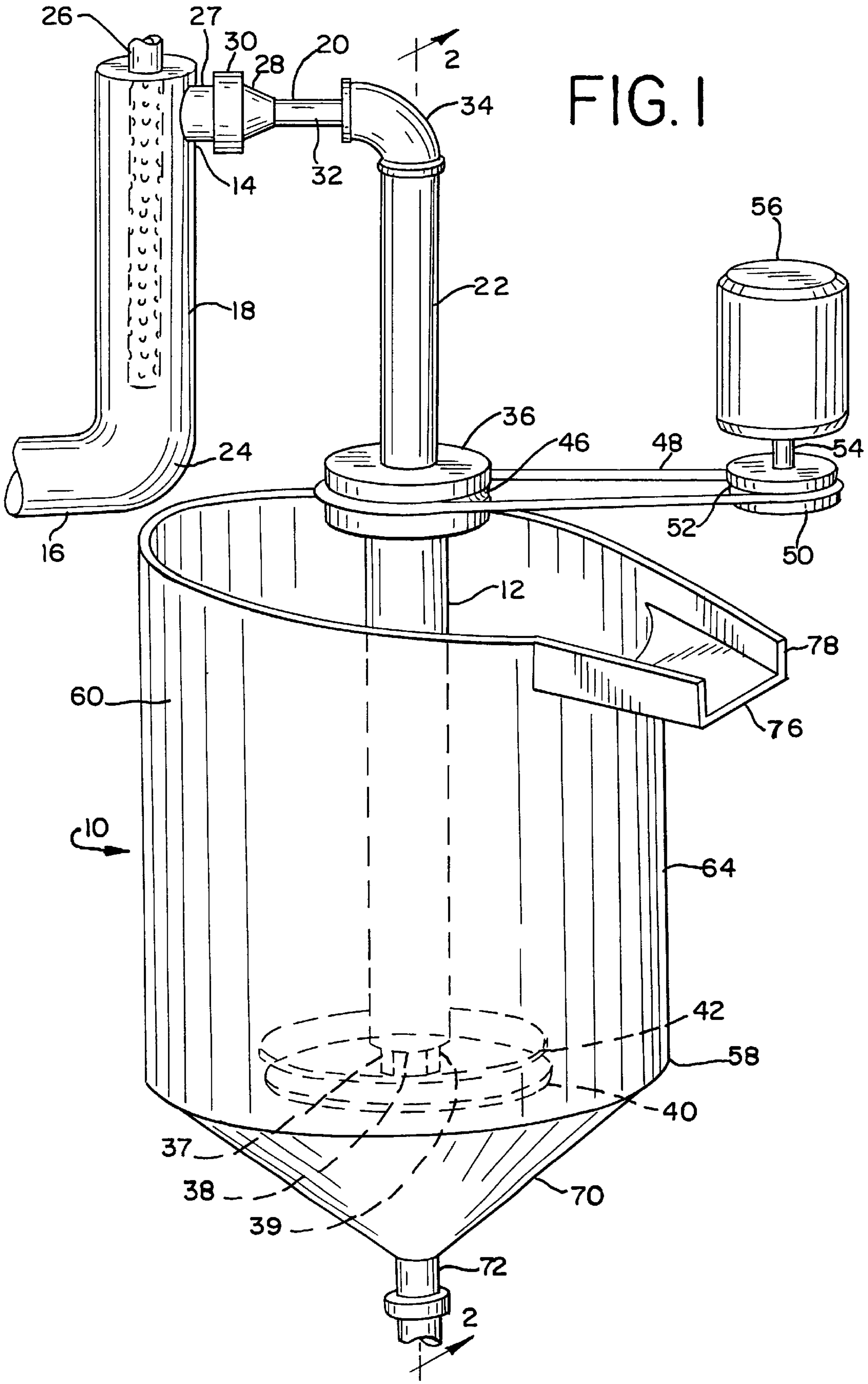
FIG. 1 is a perspective view of a centrifugal flotation cell with a rotating feed in accordance with principles of the present invention.
Figure 2:
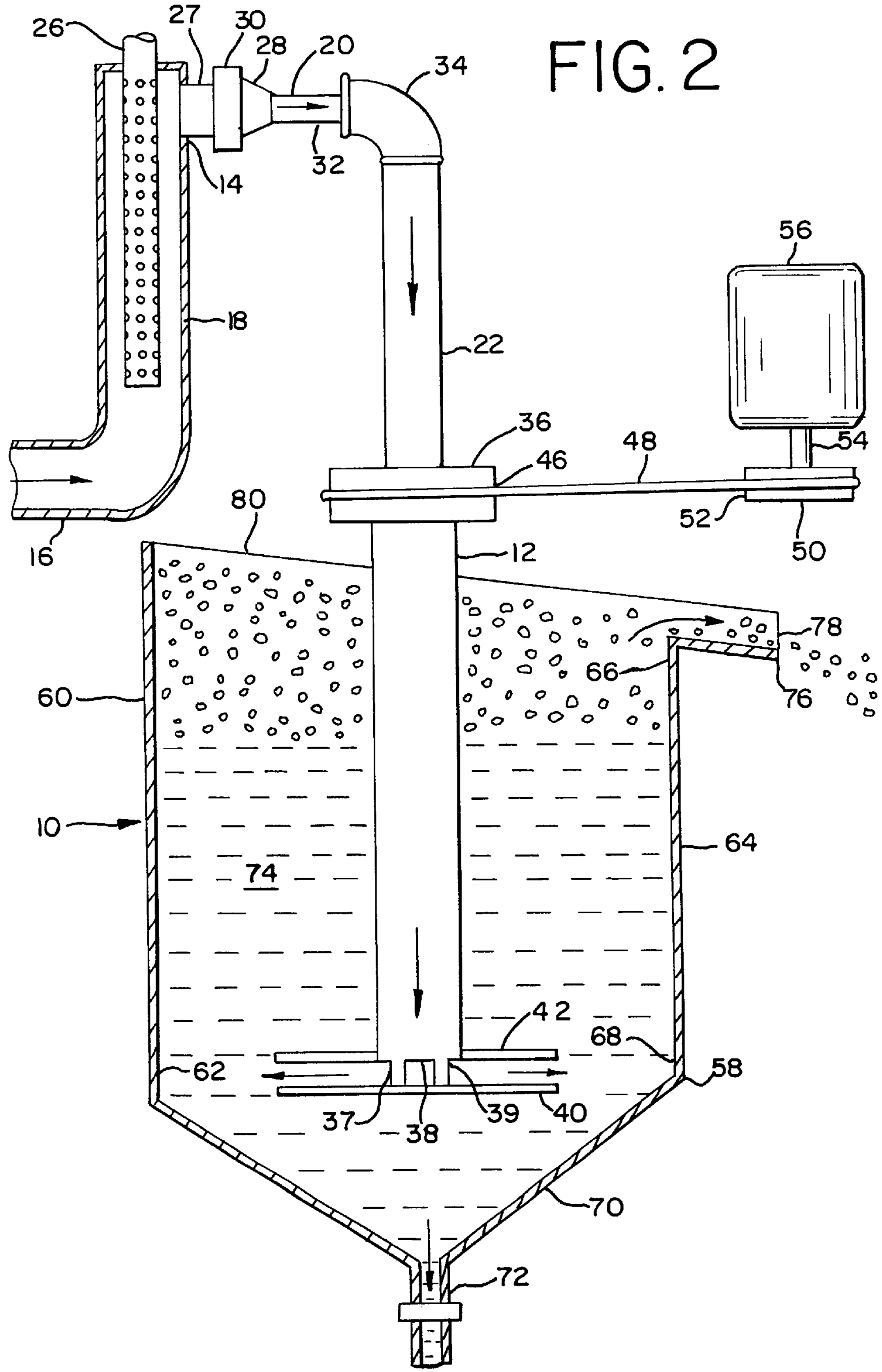
FIG. 2 is a cross-sectional view of the centrifugal flotation cell taken substantially along line 2—2 of FIG. 1.

Referring to FIGS. 1 and 2, a centrifugal flotation cell 10 with a rotating feed 12 (rotating feed line) provides an apparatus and separator equipment to recover fine particles (fines) comprising particulates of minerals, metal, ore, etc. The centrifugal flotation cell, which is also referred to as a "CFC" or "CFC-Q2", can have a stationary fixed slurry line 14, comprising one or more sections of pipe, conduits or tubes. The slurry line can comprise a slurry feed line with a lower transverse horizontal slurry feed section 16, a vertical sparger section 18, an upper transverse horizontal section 20, and an overhead stationary fixed upright vertical section 22 which provides an upper vertical pipe. The lower transverse slurry feed section 16 is connected to and communicates with the lower portion of the vertical sparger section 18 via a lower rounded elbow 24 to pass a slurry feed (slurry) containing fine particles (fines) into the vertical sparger section. A sparger 26 which provides an air-injector and aerator, can be positioned in the upper portion of the vertical sparger section of the slurry line to inject air bubbles into the slurry and aerate the slurry. The upper transverse horizontal section can have: an enlarged diameter portion 27 connected to the upper portion of the vertical sparger section, a frustroconical truncated contraction section or neck 28 which can be connected to the enlarged diameter portion by a vertical fitting 30 or collar, and a reduced diameter portion 32 positioned between the neck and an upper elbow 34. The upper transverse section can extend horizontally between and connect and communicate with the upper portion of the vertical sparger section and the upper portion of the upper vertical pipe via the upper elbow. The upper vertical pipe providing the overhead stationary upright section is positioned along a vertical axis above and is aligned in vertical registration and communicates with the rotating feed line. The slurry feed line feeds and passes a slurry (slurry feed) containing the fine particles sought to be recovered, to the rotating feed line. The air bubbles and aerated slurry can be pumped through the slurry feed line to the rotating feed line.

The rotating feed line 12 (rotating feed) comprises a centrifugal rotating (rotatable) downfeeder, which is also referred to as a rotating downcomber. The downfeeder can comprise a rotatable upright vertical conduit, pipe, tube or line. The moveable downfeeder rotates about its vertical axis and is aligned in vertical registration and positioned below the overhead stationary section comprising the upper vertical pipe. The upper portion of the downfeeder is operatively connected to the lower portion of the overhead stationary section by an annular collar 36. The downfeeder passes and facilitates movement of the aerated slurry of fine particles and air bubbles in a downward direction. The lower portion of the downfeeder has a circular array, set or series of holes or apertures, such as four aliquot apertures, providing radial exit ports 37–39 (FIG. 2) for radial discharge of the slurry and air bubbles.

A substantially planar or flat imperforate lower containment base plate 40 (FIG. 2) is positioned securely flush against and is welded, mounted or otherwise fixedly connected to the bottom end of the lower portion of the downfeeder below the exit ports. The lower containment base plate can comprise a circular disc with a maximum diameter and transverse span that is greater than the maximum diameter of the downfeeder to provide a lower barrier and platform which extends radially and circumferentially outwardly of the downfeeder to provide a lower barrier. The lower containment base plate substantially blocks, closes and plugs the lower portion of the downfeeder below the exit ports to substantially prevent downward vertical discharge and flow of the slurry and air bubbles below the exit ports, along the vertical axis of the downfeeder.

An upper annular containment base plate 42 (FIG. 2) is positioned circumferentially about and extends radially outwardly from the lower portion of the downfeeder above the exit ports. The upper containment base plate is welded, mounted, fastened, or otherwise fixedly secured to the exterior outer wall surface of the downfeeder.

The upper containment base plate can be substantially planar or flat with an outer circular edge. Desirably the upper containment base plate provides an upper annular barrier and platform to substantially prevent upward discharge of the slurry and waste stream above the exit ports. The upper and lower containment base plates are preferably parallel and cooperates with each other to provide baffles to enhance radial discharge of the slurry, waste stream, froth and bubbles from the exit ports. The upper and lower containment base plates can extend horizontally from 5% to 95%, preferably from 25% to 75%, of the minimum distance between the downfeeder and the upright wall of the flotation chamber.

The annular collar 36 (FIGS. 1 and 2) provides a driven pulley or pulley wheel which is rotatably coupled, such as by a sleeve of ball bearings, about the overhead stationary section comprising the upper vertical pipe. The collar is welded, mounted, fastened, or otherwise fixedly secured to the centrifugal rotating downfeeder. The pulley wheel comprises a collared rim with a belt-receiving grooved central portion 46 (FIG. 1) to snugly receive a drive belt 48. The drive belt operatively connects and rotatably couples the driver pulley wheel (collar) with a drive pulley 50 or pulley wheel. The drive pulley can be smaller, larger, or the same size as the driven pulley (collar) to decrease, increase, or be the same rotational speed (rpm), respectively, as the driven pulley. The drive pulley can comprise an outer rim with a belt-receiving grooved central portion 52 to snugly receive the drive belt. The drive pulley can be connected by an upright rotatable vertical shaft 54 to an overhead variable speed motor 56. The shaft can be welded, mounted or otherwise fixedly secured to the top of the drive pulley. The motor rotates the shaft, drive pulley, belt, driven pulley (collar), and downfeeder with sufficient speed (rpm) and centrifugal force to separate the slurry in the flotation chamber into a waste stream comprising non-floating gangue material and a particulate-enriched froth comprising air bubbles carrying a substantial portion of the valuable particulates (fines). The waste stream and froth are discharged and propelled radially outwardly from the exit ports at the lower end of the rotating downfeeder.

A flotation chamber 58 (FIG. 2) provides a housing that is concentrically positioned about the downfeeder. The floatation chamber has an annular circular vertical wall 60 with upright wall portions having an interior inwardly facing, inner, impingement surface 62 and an exterior outer surface 64. The upright wall portions of the flotation chamber's annular vertical wall comprises an upper overflow portion providing an upright vertical overflow wier 66 and a lower portion 68 connected to a flared, upwardly diverging, frustro-conical waste-containing portion 70. The flared waste-containing portion is inclined and extends downwardly and inwardly from the upright wall portions to provide an inclined floor. A discharge conduit or pipe provides a waste outlet 72 which is spaced at a level below the exit ports and lower base plate of the downfeeder. In the illustrative embodiment, the waste outlet is positioned along the vertical axis and is concentric to the downfeeder to provide a discharge opening for egress and discharge of the waste stream comprising nonfloating gangue material.

The upright annular wall of the flotation chamber provides a vertical wier which can extend to a height slightly below the collar. The wier is spaced away from and cooperates with the downfeeder to provide an annular passageway 74 (FIG. 2) therebetween for upward passage of the particulate-enriched froth comprising air bubbles containing entrained particulates. A froth launder comprising an inclined overflow discharge chute 76 (FIGS. 1 and 2) is connected to the top of the wier. The chute extends outwardly and downwardly at an angle of inclination from the top portion of the wier of the flotation chamber to discharge the particle-enriched froth comprising air bubbles carrying entrained particulates. A top rail 78 (FIG. 1), which provides a flange, can be positioned along the top of the chute and wier. In order to facilitate flow, spillage and discharge of the froth downwardly into the chute, the upper rim and edge 80 (FIG. 2) of the wier and annular wall of the flotation chamber can be at an angle of inclination. The upper edge of the uppermost wall portions of the wier, opposite the chute, can be at a height and level above the chute. The chute-engaging wall portions abutting against and connected to the chute, can be at a height and level below the maximum height of the wier opposite the chute.

In use, a conditioned feed slurry is pumped, introduced and fed into the slurry feed line where it is injected and aerated with air bubbles from the sparger. The slurry and air bubbles then flow horizontally through the transverse section of the slurry feed line and downwardly through the stationary upper vertical pipe and rotating feed line comprising the centrifugal rotating downfeeder. The rotating centrifugal downfeeder (vertical rotating feed pipe) spins and rotates the slurry and air bubbles with sufficient centrifugal force to separate the slurry in the flotation chamber into: (1) a waste stream of gangue material comprising slurry waste with unfloated particles; and (2) a particulate-enriched froth comprising air bubbles carrying the bulk of the fine particles sought to be recovered. The waste stream is ejected and driven radially outwardly by centrifugal force through the exit ports of the downfeeder towards the impingement wall of the flotation chamber. The upper and lower containment base plates enhance and facilitate radial discharge of the waste stream and froth. Upon discharge past the lower containment base plate, the waste stream moves and flows downwardly by gravity flow along the inclined floor of the flotation chamber through the waste outlet for disposal in a tailings pond.

The particle-enriched froth containing air bubbles with entrained fine particles moves upwardly and rises to and floats at the surface. The froth then flows radially outwardly and over the top of the overflow wier and down the launder comprising the inclined chute where it is discharged as a concentrate for further processing.

The centrifugal flotation cell with a rotating feed can be used to recover sulphides (sulfides) and non-sulphide minerals, metals and trace elements with coarse and very fine grinding. The centrifugal flotation cell with a rotating feed is especially useful to recover valuable fine particles, such as, chalcopyrite ($CuFeS_2$), galena (PbS), sphalerite (ZnS), pentlandite [(FeNi)S], molybdenite ($MoS_2$), gold (Au), phosphate ($P_2O_5$), and coal, as well as valuable fine particulates from porphyry copper-gold ore, sulphide copper-lead-zinc ore, sulphide nickel ore and other ores. The centrifugal flotation cell with a rotating feed can also be used to separate and recover oil, petroleum, petrochemicals and other hydrocarbons from water and other liquids, as well as to separate slurries and liquids contaminated with fine particles in waste treatment facilities, waste water cleanup and treatment.

The slurry feed rate in the centrifugal flotation cell with the rotating feed can range from 1–3 liters per minute. The air flow rate (sparger air injection rate) can be from 2–10 liters per minute. The rotating feed comprising the centrifuge downfeeder rotate at a speed of 0.1–800 rpm. In some circumstances, it may be desirable to use other slurry feed rates, air flow rates, and rotational speeds.

Advantageously, the centrifugal flotation cell can quickly recover 98% of fine particles including most fine particles less than 50 microns and many fine particles as small as 2–10 microns.

EXAMPLES 1–5

The centrifugal flotation cell with a rotating feed was operated at different rotating speeds (rotational speeds), with an air flow rate of 12 liters per minute. No further grinding was necessary since the mineral particles were already within the 20 micron range. The percentage concentration of lead minerals in the particulate-emiched froth and in the waste stream (tailings) of gangue material are indicated in Table 1 as follows, as is the percentage of lead minerals recovered.

TABLE 1

Test Results
Centrifugal Flotation Cell With Rotating Feed
Effect of Rotating Speed of Rotating Centrifugal Downfeeder

| Test | Rotating | Grade, % Lead | | % |
|---|---|---|---|---|
| No. | Speed - RPM | Froth | Gangue | Recovery |
| 1 | 440 | 84.79 | 0.11 | 97.52 |
| 2 | 220 | 86.1 | 0.11 | 97.62 |
| 3 | 0 | 60.39 | 0.58 | 88.07 |
| 4 | 220 | 57.96 | 0.27 | 94.32 |
| 5 | 440 | 82.69 | 0.28 | 93.33 |

Air Flow Rate: 12 LPM

It is evident from the tests in Examples 1–5 that an optimum speed of 220–440 rpm can attain the highest percentage recovery of lead minerals, as well as the highest concentration grade of lead minerals.

EXAMPLES 5–7

The centrifugal flotation cell with a rotating feed of Examples 1–5 were operated at a rotating speed of 440 rpm and an air flow rate of 12 liters per minute, but with different grind times as indicated in Table 2 as follows. The percentage concentration of lead minerals in the particulate-enriched froth and in the waste stream (tailings) of gangue material are shown in Table 2, as is the percentage of lead minerals recovered.

TABLE 2

Centrifugal Flotation Cell with Rotating Feed
Effect of Grind

| Test | Grind Time | Grade, % Lead | | % |
|---|---|---|---|---|
| No. | Minutes | Froth | Gangue | Recovery |
| 5 | 0 | 82.69 | 0.28 | 93.33 |
| 6 | 15 | 65.45 | 0.87 | 79.08 |
| 7 | 30 | 60.88 | 0.78 | 82.4 |

Speed: 440 RPM
Air Flow Rate 12 LPM

It is apparent from the tests that optimum grinding time to achieve the highest percentage recovery of lead minerals is 0 minutes, i.e., all minus 48 mesh. Greater concentration grade of lead minerals in the froth occurred with less grinding.

EXAMPLES 7–9

The centrifugal flotation cell with a rotation feed of Examples 5–7 were operated at a rotating speed of 440 rpm and at a grind time of 30 minutes, but with different air flow rates as follows. The percentage concentration of lead minerals in the particulate-enriched froth and in the waste stream (tailings) of gangue material are shown in Table 3 as is the percentage of lead minerals recovered.

TABLE 3

Centrifugal Flotation Cell with Rotating Feed
Effect of Air Flow

| Test | Air Flow Rate | Grade, % Lead | | % |
|---|---|---|---|---|
| No. | LPM | Froth | Gangue | Recovery |
| 7 | 12 | 60.88 | 0.78 | 82.4 |
| 8 | 6 | 82.3 | 0.9 | 76.78 |
| 9 | 3 | 77.85 | 1.47 | 66.34 |

Speed: 440 RPM
Grind: 30 Min.

It appears from the tests that optimum air flow rate to achieve the highest percentage recovery of lead minerals is 12 liters per minute, but an air flow rate of 6 liters per minute achieved a greater concentration grade of lead minerals in the froth. In these tests, 92% of the lead particulates (fines) recovered were of a size less than 20 microns while 14% of the lead particulates (fines) recovered were smaller than 14 microns.

The centrifugal flotation cell with a rotating feed is useful to separate and recover sulphide (sulfide) minerals, non-sulphide (non-sulfide) minerals and precious metals, as well as other metals, ores and fine particles. Among the many types of sulphide minerals that can be separated and recovered by the inventive centrifugal flotation cell with a rotating feed are: arsenopyrite, bornite, chalcocite, chalcopyrite, cobaltite, covellite, galena, marcasite, molybdenite, pentlandite, polydymite, pyrite, pyrrhotite, sphalerite, stibnite, tetrahedrite, and vaesite. Among the many types of non-sulphide minerals that can be separated and recovered by the inventive centrifugal flotation cell with a rotating feed are: anglesite, apatite, azurite, cassiterite, cerussite, chromite, coal, cuprite, fluorite, garnet, graphite, iron-oxides, malachite, monozite, potash, pyrolusite, rare earths, rutile, scheelite, smithsonite, talc, wolframite, zincite, and zircon. Among the many types of precious metals that can be separated and recovered by the inventive centrifugal flotation cell with a rotating feed are gold, silver, and platinum. Other types of sulphite minerals, non-sulphite minerals, and precious metals can be separated and recovered by the centrifugal flotation cell with a rotating feed of this invention.

Among the many advantages of the inventive process and centrifugal flotation cell with a rotating feed are:

1. Superior reclaimation of fine particles of minerals, metals, trace elements, ores and other materials.
2. Outstanding ability to recovery fine mineral particles which are unrecoverable with most conventional processes.
3. Enhanced recovery of valuable fines.
4. Greater recovery of small particulates.
5. Better centrifugal separation and flotation.
6. Faster mineral flotation kinetics.
7. Greater concentration and recovery of fine particles.
8. Simple to operate.
9. Better throughput.
10. Convenient.
11. Dependable.

12. User-friendly.
13. Economical.
14. Efficient.
15. Effective.
16. A smaller unit volume required as compared with a conventional flotation cell.
17. Energy saving.
18. Low power cost.

Although embodiments of this invention have been shown and described, it is to be understood that various modifications and substitutions, as well as rearrangements, of parts, components, equipment and process steps, can be made by those skilled in the art without departing from the novel spirit and scope of the invention.

What is claimed is:

1. A centrifugal flotation cell, comprising:

a rotatable downfeeder for moving an aerated slurry of particles and gaseous bubbles in a downward direction, said particles comprising particulates selected from the group consisting of minerals, metals, ore and oil;

a motor operatively associated with said downfeeder for rotating said downfeeder with sufficient centrifugal force and speed to separate said aerated slurry into a waste stream comprising non-floating gangue material and a particulate enriched froth comprising gaseous bubbles carrying a substantial portion of said particulates;

a flotation chamber positioned about said downfeeder, said flotation chamber having an outlet positioned at a level below said downfeeder for discharging said waste stream and said flotation chamber having an overflow portion for discharging said froth;

a slurry feed line communicating with said downfeeder for passing slurry to said downfeeder; and an aerator comprising air injectors communicating with said slurry line for aerating said slurry and injecting gaseous bubbles into said slurry feed line.

2. A centrifugal flotation cell in accordance with claim 1 wherein said downfeeder comprises an upright rotatable conduit.

3. A centrifugal flotation cell in accordance with claim 2 including a stationary upright pipe positioned above and communicating with said rotatable conduit.

4. A centrifugal flotation cell in accordance with claim 3 including:

a collar connecting said stationary pipe and said rotatable conduit; and a belt driven by said motor for rotating said collar and said conduit.

5. A centrifugal flotation cell in accordance with claim 1 wherein said overflow portion comprises a wier with a discharge chute.

6. A centrifugal flotation cell in accordance with claim 1 including a barrier for substantially preventing downward egress of said slurry from said downfeeder.

7. A centrifugal flotation cell in accordance with claim 6 wherein said barrier comprises a platform positioned between said downfeeder and said outlet, and said platform has a greater transverse span than said downfeeder.

8. A centrifugal flotation cell in accordance with claim 1 wherein said downfeeder has a lower portion defining at least one exit port for lateral discharge of said slurry.

9. A centrifugal flotation cell in accordance with claim 8 including a lower base plate positioned against the lower portion of said downfeeder.

10. A centrifugal flotation cell in accordance with claim 9 including an upper base plate above said exit port.

11. A centrifugal flotation cell for removing fine particles, comprising:

a centrifugal rotating downfeeder comprising an elongated upright rotatable conduit positioned along a substantially vertical axis for passing and facilitating movement of an aerated slurry of particles and air bubbles in downward direction, said particles comprising particulates selected from the group consisting of minerals, metal, ore, and oil, said downfeeder having an upper portion and a lower portion, and said lower portion defining an array of radial exit ports for radial discharge of said slurry and air bubbles;

a slurry line comprising an overhead stationary fixed upright section positioned along said vertical axis above said centrifugal rotating downfeeder, said stationary pipe being substantially aligned in vertical registration and concentric with said downfeeder and communicating with said downfeeder for feeding said aerated slurry downwardly into said centrifugal rotating downfeeder;

a collar connecting said stationary pipe and said downfeeder;

a sparger communicating with said slurry line to inject air bubbles into said slurry and aerate said slurry;

a substantially planar lower base plate positioned securely flush against the lower portion of said downfeeder below said exit ports, said base plate providing a barrier having a greater transverse span than the maximum diameter of the lower portion of said downfeeder for substantially blocking, closing and plugging the lower portion of said downfeeder below said exit ports to substantially prevent downward vertical discharge of said slurry below said exit ports along said vertical axis;

a drive pulley;

a drive belt operatively, connecting said drive pulley and said driven pulley;

a motor operatively connected to said drive pulley for rotating said pulleys, belt, and downfeeder with sufficient speed and centrifugal force to separate said slurry in said centrifugal downfeeder into a waste stream comprising non-floating heavier gangue material and a particulate-enriched froth comprising air bubbles carrying a substantial portion of said particulates, said waste stream and said froth being ejected and discharged from said exit ports of said downfeeder;

a flotation chamber positioned about said downfeeder, said flotation chamber having upright wall portions providing an impingement surface and a flared frustroconical portion extending downwardly and inwardly from said upright wall portions, said flotation chamber defining a waste outlet spaced below said downfeeder and said lower base plate, said waste outlet positioned along said vertical axis for discharging said waste stream comprising non-floating heavier gangue material, said upright wall portions comprising an upright overflow wier with an upper overflow portion and a lower portion connected to said flared portion, and an inclined discharge chute extending downwardly at an angle of inclination from said upper overflow portion for discharging said particulate enriched froth comprising air bubbles carrying a substantial portion of said particulates.

12. A centrifugal flotation cell in accordance with claim 1 wherein said slurry line further comprises:

a substantially vertical sparger section with an upper portion and a lower portion; said sparger being positioned within said vertical sparger section of said slurry line;

an upper transverse section extending substantially horizontally between and communicating with the upper portion of said vertical sparger section and said stationary pipe; and a lower transverse section connected to and communicating with said lower portion of said vertical sparger section; and said sections of said slurry line being selected from the group consisting of pipes, conduits, tubes, and combinations thereof.

13. A centrifugal flotation cell in accordance with claim 11 wherein said motor comprises a variable speed motor.

14. A centrifugal flotation cell in accordance with claim 11 wherein said upright wall portions of said flotation chamber comprising an annular circular wall.

15. A centrifugal flotation cell in accordance with claim 11 including an upper annular base plate positioned about and secured to said downfeeder above said exit ports, said upper annular base plate being substantially planar and extending radially outwardly from said downfeeder for preventing substantial upward discharge of said slurry above said exit ports, and said upper annular base plate being substantially parallel and cooperating with said lower base plate to provide containment plates comprising baffles for enhancing radial discharge of said slurry and froth from said exit ports.

* * * * *